US012474607B2

(12) United States Patent
Shirotori et al.

(10) Patent No.: US 12,474,607 B2
(45) Date of Patent: *Nov. 18, 2025

(54) BACKLIGHT WITH MULTIPLE MICROREPLICATED OPTICAL FILMS

(71) Applicant: 3M INNOVATIVE PROPERTIES COMPANY, St. Paul, MN (US)

(72) Inventors: Hideaki Shirotori, Yokohama (JP); Kazuhiko Toyooka, Yamagata (JP); Sayaka Kado, Yamato (JP); Gary T. Boyd, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/712,326

(22) PCT Filed: Dec. 2, 2022

(86) PCT No.: PCT/IB2022/061729
§ 371 (c)(1),
(2) Date: May 22, 2024

(87) PCT Pub. No.: WO2023/105375
PCT Pub. Date: Jun. 15, 2023

(65) Prior Publication Data
US 2025/0012963 A1   Jan. 9, 2025

Related U.S. Application Data

(60) Provisional application No. 63/286,792, filed on Dec. 7, 2021.

(51) Int. Cl.
G02F 1/1335    (2006.01)
F21V 8/00      (2006.01)
G02F 1/13357   (2006.01)

(52) U.S. Cl.
CPC .. *G02F 1/133607* (2021.01); *G02F 1/133603* (2013.01); *G02F 1/133606* (2013.01);
(Continued)

(58) Field of Classification Search
CPC .............. G02F 1/133606; G02F 1/133607
See application file for complete search history.

(56) References Cited

U.S. PATENT DOCUMENTS 7,236,286 B2 * 6/2007 Clikeman ............ G02B 6/0053
                                                        359/247
8,465,193 B1    6/2013 Arik et al.
(Continued)

FOREIGN PATENT DOCUMENTS

KR   20100042593 A  *  4/2010 ....... G02F 1/133606
KR   20110016819 A     2/2011
WO   2022106962 A1     5/2022

OTHER PUBLICATIONS

International Search Report for PCT International Application No. PCT/IB2022/061729, mailed on Mar. 13, 2023, 3 pages.

*Primary Examiner* — Keith G. Delahoussaye
(74) *Attorney, Agent, or Firm* — Jonathan L. Tolstedt

(57) ABSTRACT

A backlight to a display includes an array of discrete light sources and a plurality of optical films disposed between the display and the light sources. Each film includes a regular array of intersecting ridges defining a plurality of through-holes. Each of the through-holes extends between first and second open ends of the through-hole. A cross-section of the optical film in a plane parallel to a thickness direction of the film includes two adjacent ridges in the array of ridges and a through-hole therebetween. The film has a maximum thickness $h_{max}$ and the through-hole includes a side wall with a substantially vertical portion connected to the first open end of the through-hole and a substantially horizontal portion extending from the substantially vertical portion and (Continued)

connected to the second open end. The substantially horizontal portion has a minimum thickness $h_{min}$ at a location between the two adjacent ridges, $h_{max}/h_{min} \geq 2$.

16 Claims, 11 Drawing Sheets

(52) U.S. Cl.
CPC ...... *G02F 1/133611* (2013.01); *G02B 6/0051* (2013.01); *G02B 6/0068* (2013.01)

(56) References Cited

U.S. PATENT DOCUMENTS

| | | | |
|---|---|---|---|
| 2002/0180909 A1* | 12/2002 | Lubart | G02B 5/08 |
| | | | 349/113 |
| 2005/0213245 A1* | 9/2005 | Katsura | G02B 5/021 |
| | | | 359/443 |
| 2007/0160811 A1* | 7/2007 | Gaides | G02B 5/003 |
| | | | 428/173 |
| 2008/0117638 A1 | 5/2008 | Mai | |
| 2010/0061087 A1 | 3/2010 | Stevens et al. | |
| 2013/0135750 A1* | 5/2013 | Walker, Jr. | G02B 5/286 |
| | | | 359/885 |
| 2016/0298828 A1 | 10/2016 | Chang et al. | |
| 2020/0166767 A1* | 5/2020 | Qin | H01L 25/0753 |
| 2021/0116627 A1 | 4/2021 | Tsuji | |

* cited by examiner

BACKLIGHT WITH MULTIPLE MICROREPLICATED OPTICAL FILMS

CROSS REFERENCE TO RELATED APPLICATIONS

This application is a national stage filing under 35 U.S.C. 371 of PCT/IB2022/061729, filed Dec. 2, 2022, which claims the benefit of U.S. Provisional Application No. 63/286,792, filed Dec. 7, 2021, the disclosures of which are incorporated by reference in their entireties herein.

SUMMARY

In some aspects of the present description, a backlight for providing illumination along a first direction to a display disposed thereon is provided, the backlight including a plurality of spaced apart discrete light sources arranged in rows and columns of the light sources and configured to face the display, and an optical film disposed on the light sources and below and proximate a first plane. The optical film and the first plane are configured to be disposed between the display and the light sources. The optical film includes a plurality of through-holes arranged in rows and columns of the through-holes and extending between first and second major surfaces of the optical film. Each through-hole has a first opening with a first open area, A1, at the first major surface, and a second opening with a second open area, A2, at the second major surface. Each through-hole has a length, H, along the first direction such that the ratio of H/A2 is greater than or equal to about 0.13. When all the light sources emit light, the light emitted by all the light sources has a first overall peak intensity as measured in the first plane, and a first brightness uniformity as measured across the first plane. In the absence of the optical film, the light emitted by all the light sources has a second overall peak intensity as measured in the first plane, and a second brightness uniformity as measured across the first plane. The first and second overall peak intensities are different by less than about 20%, and the first brightness uniformity exhibits an improvement over the second brightness uniformity by at least 2.8%.

In some aspects of the present description, an optical film is provided, the optical film including a structured first major surface opposite a second major surface. The first major surface includes a plurality of posts arranged in rows and columns, and a plurality of ridges extending between, and recessed relative to, the posts. A plurality of through-holes extends between the first and second major surfaces, and each through-hole includes a first opening at the first major surface defined by, and recessed relative to, a number of ridges in the plurality of ridges, and having a first maximum dimension, and a second opening at the second major surface, and having a second maximum dimension different than the first maximum dimension.

In some aspects of the present description, an optical film is provided, the optical film including a structured first major surface opposite a second major surface. The first major surface includes a plurality of posts arranged in rows and columns, and a plurality of ridges extending between, and recessed relative to, the posts, and a plurality of recesses extending from the first major surface into the optical film in a thickness direction. Each recess includes a first open end at the first major surface defined by, and recessed relative to, a number of ridges in the plurality of ridges, and having a first maximum dimension, and a second closed end recessed from the first open end by a distance D and having a second maximum dimension different than the first maximum dimension.

In some aspects of the present description, a backlight for providing illumination along a first direction to a display disposed thereon is provided, the backlight including a plurality of spaced apart discrete light sources arranged in rows and columns of the light sources and configured to face the display, and an optical film having a structured first major surface opposite a second major surface, and a plurality of through-holes extending between the first and second major surfaces. The optical film is disposed on the light sources and below and proximate a first plane. The optical film and the first plane are configured to be disposed between the display and the light sources. When the optical film is disposed such that the first major surface faces the light sources, an average luminance in the first plane is smaller and a first brightness uniformity value is smaller, and when the optical film is disposed such that the second major surface faces the light sources, the first average luminance in the first plane is greater and the first brightness uniformity value is greater, wherein brightness uniformity value is calculated by dividing a maximum luminance value in the first plane by a minimum luminance value in the first plane.

In some aspects of the present description, a backlight for providing illumination to a display panel is provided, the backlight including a two-dimensional array of spaced apart discrete light sources and a plurality of optical films disposed on the light sources and configured to be disposed between the display panel and the light sources. Each of the optical films includes a regular two-dimensional array of intersecting ridges defining a plurality of through-holes therebetween. Each of the through-holes extends between a first open end and a second open end of the through-hole at opposing respective first and second major surfaces of the optical film. In a first cross-section of the optical film in a first plane that is parallel to a thickness direction of the optical film and includes two adjacent ridges in the array of ridges and a through-hole therebetween, the optical film has a maximum thickness $h_{max}$. The through-hole includes a side wall with a substantially vertically-oriented portion connected to the first open end of the through-hole and a substantially horizontally-oriented portion extending from the substantially vertically-oriented portion and connected to the second open end. The substantially horizontally-oriented portion has a minimum thickness $h_{min}$ at a location disposed between the two adjacent ridges, such that $h_{max}/h_{min}$ is greater than or equal to about 2.

In some aspects of the present description, a backlight for providing illumination along a first direction to a display disposed thereon is provided, the backlight including a plurality of spaced-apart discrete light sources arranged in rows and columns of the light sources and configured to face the display, an optical stack including two or more optical films disposed on the light sources and below and proximate a first plane, the optical stack and the first plane configured to be disposed between the display and the light sources, and a diffuser layer, disposed between the optical stack and the display. Each optical film in the optical stack includes a plurality of through-holes arranged in rows and columns of the through-holes and extending between first and second major surfaces of the optical film. Each through-hole has a first opening at the first major surface having a first open area, A1, and a second opening at the second major surface having a second open area, A2. Each through-hole has a height, H, along the first direction such that the ratio of H/A2 is greater than or equal to about 0.13. When all the light sources emit light, the light emitted by all the light sources has a first average luminance in the first plane, and in the absence of the optical stack, the light emitted by all the light sources has a second average luminance in the first plane, wherein the first average luminance is greater than the second average luminance.

DETAILED DESCRIPTION

Figure 1A:
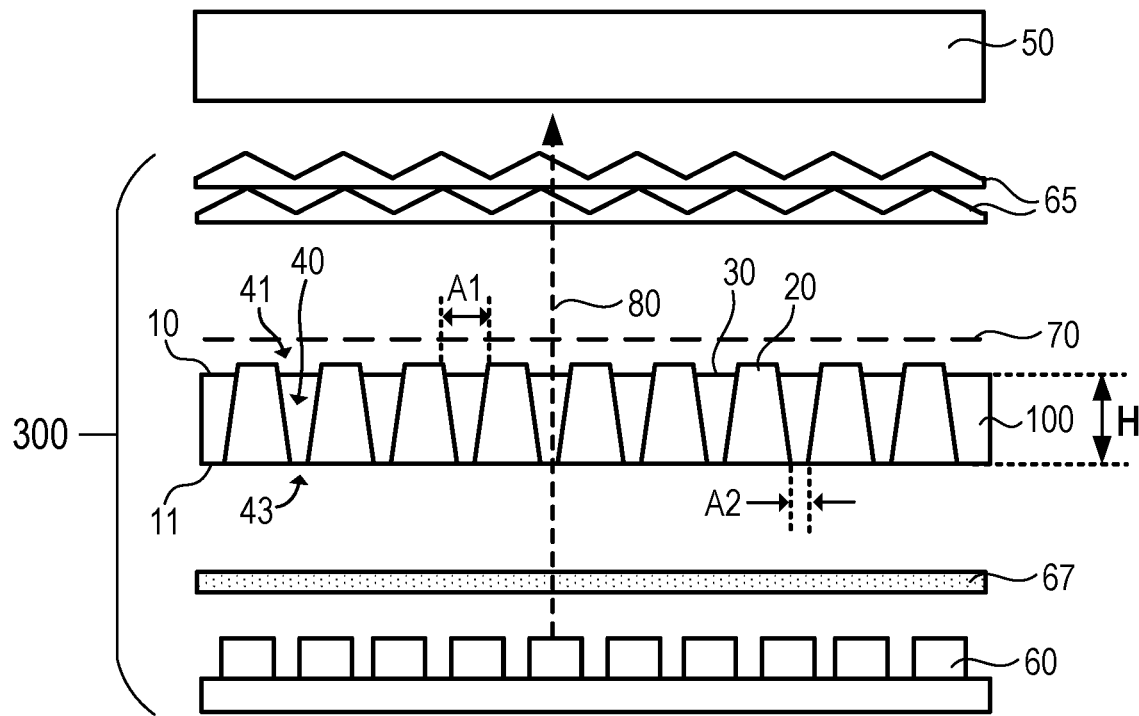
FIGS. 1A and 1B provide side views of a backlight for providing illumination to a display, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some aspects of the present description, a backlight for providing illumination along a first direction (e.g., a thickness direction, or z-axis, of the backlight) to a display disposed thereon includes a plurality of spaced apart discrete light sources (e.g., light-emitting diodes) arranged in rows (e.g., along an x-axis of the backlight) and columns (e.g., along a y-axis of the backlight) of the light sources and configured to face the display, and an optical film disposed on the light sources and below and proximate a first plane. The optical film and the first plane are configured to be disposed between the display and the light sources.

In some embodiments, the optical film may include a plurality of through-holes arranged in rows and columns of the through-holes and extending between first (e.g., top) and second (e.g., bottom) major surfaces of the optical film. In some embodiments, each through-hole has a first opening with a first open area, A1, at the first major surface, and a second opening with a second open area, A2, at the second major surface. In some embodiments, each through-hole has a length, H, along the first direction such that the ratio of H/A2 is greater than or equal to about 0.13.

In some embodiments, the shape of at least a portion of each through-hole may be substantially a truncated square pyramid, or a truncated cone, or a cylinder, or a rectangular prism, or any other appropriate shape. In some embodiments, the slope of any of the inner walls of each of the through-holes may be substantially vertical (e.g., in the case of a cylindrical shape or rectangular prism shape). In other embodiments (e.g., in the case of a truncated square pyramid shape or truncated cone shape), the slope of any of the inner walls of each of the through-holes may be within ±15 degrees, or within ±10 degrees, or within ±8 degrees of the first direction (e.g., along the z-axis).

In some embodiments, the open area, A1, may be greater than the open area, A2. In other embodiments, A1 may be less than A2. In still other embodiments, A1 and A2 may be substantially equal. In some embodiments, when A1 is greater than A2 and the optical film is disposed such that A1 faces the light sources, a first average luminance in the first plane may be smaller and the first brightness uniformity may be greater. In other embodiments, when A1 is greater than A2 and the optical film is disposed such that A2 faces the light sources, the first average luminance in the first plane is greater and the first brightness uniformity is greater. Stated another way, when A1 and A2 have different areas, placing the film with the larger hole "up" (i.e., toward the display) and the smaller hole "down" (i.e., toward the light sources) may exhibit a relatively brighter average luminance and a relatively greater brightness uniformity value, when compared to the values measured when the film is reversed (larger hole "down," smaller hole "up"), where it may exhibit a relatively smaller average luminance and a relatively smaller brightness uniformity value (i.e., a more uniform display brightness).

When all the light sources emit light, the light emitted by all the light sources has a first overall peak intensity as measured in the first plane, and a first brightness uniformity as measured across the first plane. In the absence of the optical film, the light emitted by all the light sources has a second overall peak intensity as measured in the first plane, and a second brightness uniformity as measured across the first plane. The first and second overall peak intensities are different by less than about 20%, and the first brightness uniformity exhibits an improvement over the second brightness uniformity by at least 2.8%. In some embodiments, the light emitted by all the light sources may have a first average luminance in the first plane, and, in the absence of the optical film, the light emitted by all the light sources may have a second average luminance in the first plane, such that the first average luminance is greater than or equal to the second average luminance.

For the purposes of this specification, "brightness uniformity" (or simply "uniformity") shall be defined as a maximum luminance value divided by a minimum luminance value as measured across the display or a portion of a display being measured. That is, the term "uniformity", as used herein, is a specific, measured value for a display or portion of a display, and only has meaning when compared relative to a second measured uniformity value. For example, a larger value for the uniformity as calculated in this fashion is less desirable than a smaller value. That is, a larger uniformity value represents an increase in "luminance mura", or uneven spots on a display. For the purposes of this specification, the terms "nonuniformity" and "luminance mura" may be used interchangeably, and shall describe undesirable, visible brightness effects on a display (such as a spot on the display that is obviously brighter or dimmer than the surrounding areas of the display).

In the example above, when "the first brightness uniformity exhibits an improvement over the second brightness uniformity by at least 2.8%," this means that the value measured for the first brightness uniformity is less than (has fewer luminance mura than) the value measured for the second brightness uniformity by at least 2.8%.

In some embodiments, the backlight may further include a diffusing film disposed between the light sources and the optical film. In some embodiments, the backlight may further include one or more brightness enhancement films (e.g., prism films) disposed between the optical film and the display.

According to some aspects of the present description, an optical film may include a structured first major surface opposite a second major surface. The first major surface may include a plurality of posts arranged in rows and columns (e.g., arranged along an x- and y-axis of the optical film), and a plurality of ridges extending between, and recessed relative to, the posts. In some embodiments, a plurality of through-holes may extend between the first and second major surfaces, and each through-hole may include a first opening at the first major surface defined by, and recessed relative to, a number of ridges in the plurality of ridges, and a second opening at the second major surface. In some embodiments, the first opening may have a first maximum dimension, the second opening may have a second maximum dimension which is different than the first maximum dimension. In some embodiments, the first opening of each through-hole is defined by and surrounded by four ridges in the plurality of ridges. In some embodiments, each through-hole of the plurality of through-holes may define a distance, H, between the first opening and the second opening, and the second opening may have an open area A2, such that the ratio of H/A2 is greater than or equal to about 0.13.

In some embodiments, the shape of at least a portion of each through-hole may be substantially a truncated square pyramid, or a truncated cone, or a cylinder, or a rectangular prism, or any other appropriate shape. In some embodiments, the slope of any of the inner walls of each of the through-holes may be substantially vertical. In other embodiments, the slope of any of the inner walls of each of the through-holes may be within ±15 degrees, or within ±10 degrees, or within ±8 degrees of the first direction (e.g., along the z-axis).

According to some aspects of the present description, a backlight for providing illumination to a display may include a plurality of spaced-apart, discrete light sources arranged in rows (e.g., an x-axis) and columns (e.g., a y-axis) of the light sources and configured to face the display, and any of the optical films including through-holes as described herein disposed on the plurality of spaced apart discrete light sources and below and proximate a first plane.

In some embodiments, when all the light sources emit light, the light emitted by all the light sources has a first overall peak intensity in the first plane, and a first brightness uniformity across the first plane. In the absence of the optical film, the light emitted by all the light sources may have a second overall peak intensity in the first plane, and a second brightness uniformity across the first plane, such that the first and second overall peak intensities are different by less than about 20%, or about 15%, or about 10%, and the first brightness uniformity exhibits an improvement over the second brightness uniformity by at least 2.8%. In some embodiments, the light emitted by all the light sources may have a first average luminance in the first plane, and, in the absence of the optical film, the light emitted by all the light sources may have a second average luminance in the first plane, such that the first average luminance is greater than or equal to the second average luminance.

According to some aspects of the present description, an optical film includes a structured first major surface opposite a second major surface. In some embodiments, the first major surface may include a plurality of posts arranged in rows and columns (e.g., the x- and y-axis of the optical film), and a plurality of ridges extending between, and recessed relative to, the posts, and a plurality of recesses extending from the first major surface into the optical film in a thickness direction (e.g., the z-axis of the optical film). In some embodiments, each recess may include a first open end at the first major surface defined by, and recessed relative to, a number of ridges in the plurality of ridges, and a second closed end recessed from the first open end by a distance, D. The first open end may have a first maximum dimension, and the second closed end may have a second maximum dimension different than the first maximum dimension. In some embodiments, the first open end of each recess may be defined by and surrounded by four ridges of the plurality of ridges. In some embodiments, the second closed end of each recess may have a surface area, A4, such that the ratio of D/A4 is greater than or equal to about 0.13.

In some embodiments, the shape of at least a portion of each of the recesses may be a truncated square pyramid, or a truncated cone, or a cylinder, or a rectangular prism. In some embodiments, the slope of at least one inner wall of each of the recesses may be substantially vertical. In other embodiments, the slope of at least one inner wall of each of the recesses may be within ±15 degrees (or within ±10 degrees or within ±8 degrees) of the thickness direction of the optical film.

According to some aspects of the present description, a backlight for providing illumination to a display may include a plurality of spaced-apart, discrete light sources arranged in rows (e.g., an x-axis) and columns (e.g., a y-axis) of the light sources and configured to face the display, and any of the optical films including recesses as described herein disposed on the plurality of spaced apart discrete light sources and below and proximate a first plane.

In some embodiments, when all the light sources emit light, the light emitted by all the light sources has a first overall peak intensity in the first plane, and a first brightness uniformity across the first plane. In the absence of the optical film, the light emitted by all the light sources may have a second overall peak intensity in the first plane, and a second brightness uniformity across the first plane, such that the first and second overall peak intensities are different by less than about 20%, or about 15%, or about 10%, and the first brightness uniformity exhibits an improvement over the second brightness uniformity by at least 2.8%. In some embodiments, the light emitted by all the light sources may have a first average luminance in the first plane, and, in the absence of the optical film, the light emitted by all the light sources may have a second average luminance in the first plane, such that the first average luminance is greater than or equal to the second average luminance.

According to some aspects of the present description, a backlight for providing illumination along a first direction to a display disposed thereon may include a plurality of spaced apart discrete light sources (e.g., light-emitting diodes) arranged in rows and columns (e.g., the x-axis and y-axis) of the light sources and configured to face the display, and an optical film having a structured first major surface opposite a second major surface, and a plurality of through-holes extending between the first and second major surfaces. In some embodiments, the optical film may be disposed on the light sources and below and proximate a first plane. In some embodiments, the optical film and the first plane are configured to be disposed between the display and the light sources.

In some embodiments, when the optical film is disposed such that the first major surface faces the light sources, an average luminance in the first plane is smaller and a first brightness uniformity value is smaller, and when the optical film is disposed such that the second major surface faces the light sources, the first average luminance in the first plane is greater and the first brightness uniformity value is greater, wherein the brightness uniformity value is calculated by dividing a maximum luminance value in the first plane by a minimum luminance value in the first plane.

In some embodiments, each through-hole may have a first opening disposed at the first major surface and having an open area A1, and a second opening disposed at the second major surface and having an open area A2. In some embodiments, each through-hole of the plurality of through-holes defines a distance, H, between the first opening and the second opening, such that H/A2 is greater or equal to about 0.13. In some embodiments, at least one of the first opening and the second opening may include a lip protruding outwardly from a perimeter of the opening toward a center of the opening. In some embodiments, light passing through the through-hole may be scattered by the lip.

According to some aspects of the present description, a backlight for providing illumination to a display panel includes a two-dimensional array of spaced-apart discrete light sources, and a plurality of optical films disposed on the light sources and configured to be disposed between the display panel and the light sources. In some embodiments, the plurality of optical films may include at least 2, or at least 3, or at least 4, or at least 5 films.

Figure 11:
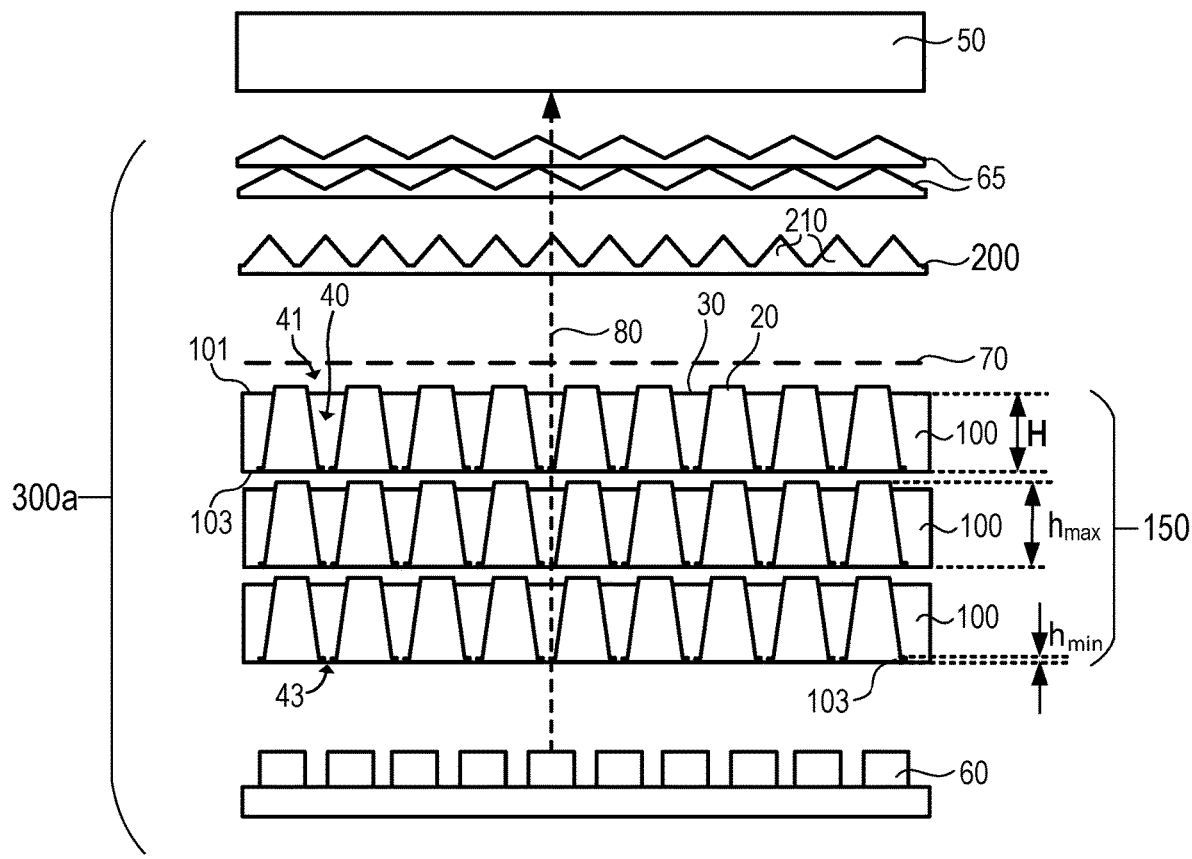
FIG. 11 is a backlight for providing illumination to a display featuring two or more optical films, in accordance with an embodiment of the present description.
Figure 11:
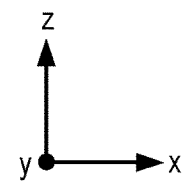

In some embodiments, each of the optical films includes a regular two-dimensional array of intersecting ridges defining a plurality of through-holes therebetween. In some embodiments, each of the through-holes extends between first and second open ends of the through-hole at opposing respective first and second major surfaces of the optical film. In some embodiments, a first cross-section of the optical film in a first plane that is parallel to a thickness direction (e.g., the z-axis of the film, such as shown in FIG. 11) of the optical film and includes two adjacent ridges in the array of ridges and a through-hole therebetween. In some embodiments, the optical film has a maximum thickness $h_{max}$ and the through-hole includes a side wall with a substantially vertically-oriented portion connected to the first open end of the through-hole and a substantially horizontally-oriented portion extending from the substantially vertically-oriented portion and connected to the second open end. In some embodiments, the substantially horizontally-oriented portion may have a minimum thickness $h_{min}$ at a location disposed between the two adjacent ridges, such that the ratio $h_{max}/h_{min}$ is greater than or equal to about 2, or about 3, or about 4, or about 5, or about 6, or about 7, or about 8, or about 9, or about 10.

In some embodiments, the backlight may further include a diffuser layer disposed between the plurality of optical films and the display panel. In such embodiments, the surface of the diffuser layer may include a plurality of microstructures (e.g., a plurality of square pyramid shapes).

In some embodiments, one of the first and second open ends of each of the through-holes of the plurality of through-holes may be larger than the other of the first and second open ends. In some embodiments, the slope of an inner wall of each of the through-holes of the plurality of through-holes may be within ±15 degrees of the thickness direction. In some embodiments, the shape of each of the through-holes may be, but is not limited to, a rectangular prism, a truncated square pyramid, a cylinder, and a truncated cone. In some embodiments, each through-hole of the plurality of through-holes defines a distance, H, between the first opening and the second opening. In some embodiments, the second opening may have an open area A2, and the ratio of H/A2 may be greater than or equal to about 0.13.

In some embodiments, each optical film of the plurality of optical films may be oriented the same as each of the other optical films in the plurality of optical films. In some embodiments, each optical film of the plurality of optical films may be oriented such that the larger of the first open end and the second open end is facing the display. In other embodiments, each optical film of the plurality of optical films may be oriented such that the larger of the first open end and the second open end is facing the two-dimensional array of spaced-apart discrete light sources.

In some embodiments, the regular two-dimensional array of intersecting ridges of each of the optical films may form orthogonal rows and columns of the posts (e.g., a two-dimensional grid). In some such embodiments, the rows of at least one of the optical films may make an angle of less than about 20 degrees, or about 15 degrees, or about 10 degrees, or about 5 degrees with the rows of at least one of the other optical films of the plurality of optical films (e.g., the films may be substantially aligned with each other, or rotated only slightly relative to each other). In other such embodiments, the rows of at least one of the optical films may make an angle of between about 10 degrees to about 80 degrees, or between about 20 degrees to about 70 degrees, or between about 30 degrees to about 60 degrees, or between about 40 degrees to about 60 degrees with the rows of at least one of the other optical films of the plurality of optical films.

According to some aspects of the present description, a backlight for providing illumination along a first direction to a display disposed thereon includes a plurality of spaced-apart discrete light sources arranged in rows and columns of the light sources and configured to face the display, an optical stack including two or more optical films disposed on the light sources and below and proximate a first plane, the optical stack and the first plane configured to be disposed between the display and the light sources, and a diffuser layer disposed between the optical stack and the display. In some embodiments, the optical stack may include 2 optical films, or 3 optical films, or 4 optical films, or 5 or more optical films.

In some embodiments, each optical film in the optical stack may include a plurality of through-holes arranged in rows and columns of the through-holes and extending between first and second major surfaces of the optical film. In some embodiments, each through-hole may have a first opening at the first major surface with a first open area, A1, and a second opening at the second major surface having a second open area, A2. In some embodiments, each through-hole may have a height, H, along the first direction such that the ratio of H/A2 is greater than or equal to about 0.13. In some embodiments, when all the light sources emit light, the light emitted by all the light sources has a first average luminance in the first plane, and, in the absence of the optical stack, the light emitted by all the light sources has a second average luminance in the first plane. In some embodiments, the first average luminance is greater than the second average luminance.

In some embodiments, the first open area A1 may be greater than second open area A2. In some such embodiments, each optical film in the optical stack may be disposed such that A1 faces the plurality of spaced-apart discrete light sources. In other such embodiments, each optical film in the optical stack may be disposed such that A1 faces the display. In still other such embodiments, at least one optical film in the optical stack may be disposed such that A1 faces the display, and at least one other optical film in the optical stack may be disposed such that A1 faces the plurality of spaced-apart discrete light sources.

In some embodiments, a surface of the diffuser layer may include a plurality of microstructures. In some such embodiments, each microstructure in the plurality of microstructures may have the shape of a square pyramid.

Turning now to the figures, FIG. 1A is a side view of a backlight for providing illumination to a display, according to the present description. In some embodiments, a backlight 300 for providing illumination 80 to a display 50 may include a plurality of spaced-apart, discrete light sources 60 and an optical film 100. In some embodiments, the discrete light sources 60 face the display (i.e., emit light 80 toward the display, in the z-direction shown in FIG. 1A) and are arranged in rows and columns of the light sources 60 (e.g., a matrix of light-emitting diodes with rows in the x-axis and columns in the y-axis, as shown in FIG. 1A). The optical film 100 is disposed on or proximate the light sources 60 and below and proximate a first plane 70 (i.e., a reference plane for discussion purposes). In some embodiments, the optical film 100 includes a plurality of through-holes 40 arranged in rows (e.g., the x-axis) and columns (e.g., the y-axis) of the optical film. Each of the plurality of through-holes 40 extend between a first major surface 10 and a second major surface 11 of the optical film 100. In some embodiments, each through-hole 40 may have a first opening 41 in the first major surface 10 with a first open area A1, and a second opening 43 in the second major surface 11 with a second open area A2. Each through-hole has a length, H, along the first direction (i.e., along the z-axis, as shown in FIG. 1A, or the "thickness direction").

In some embodiments of the optical film, when the ratio of H/A2 is configured such that it is greater than or equal to about 0.13, the light 80 provided by light sources 60 passing through optical film 100 provides a first overall peak intensity (e.g., a brightest spot) in the first plane 70 and a first brightness uniformity (e.g., a point-to-point variation in luminance, causing "bright" and "dim" spots) across the first plane 70. In the absence of the optical film 100, the light 80 has a second overall peak intensity in the first plane 70 and a second brightness uniformity across the first plane 70, such that the first overall peak intensity and the second overall peak intensity are different by less than about 20%, or about 15%, or about 10%, and the first brightness uniformity exhibits an improvement over the second brightness uniformity by at least about 2.8%, or at least about 3.0%, or at least about 5%, or at least about 10%.

In some embodiments, optical film 100 may include a plurality of posts 20 arranged in rows (e.g., the x-axis) and columns (e.g., the y-axis) of the optical film. In some embodiments, optical film 100 may also include a plurality of ridges 30 extending between, and recessed relative to, the posts (i.e., recessed below the highest point of posts 20 relative to the first major surface 10 of optical film 100). In some embodiments, the first opening 41 of each through-hole 40 may be defined by and surrounded by four ridges 30. Additional details on the posts 20 and ridges 30 may be seen in FIGS. 5A-6B.

In some embodiments, the backlight 300 may further include a diffusing film 67 disposed between the light sources 60 and the optical film 100. In some embodiments, the backlight 300 may further include one or more other optical films 65 (e.g., brightness enhancement films, "prism" films, pyramid shaped convex prism films, pyramid shaped concave prism films, reflective polarizer films, diffuser films, microlens films, and/or light recycling films) disposed between the optical film 100 and the display 50.

Figure 1B:
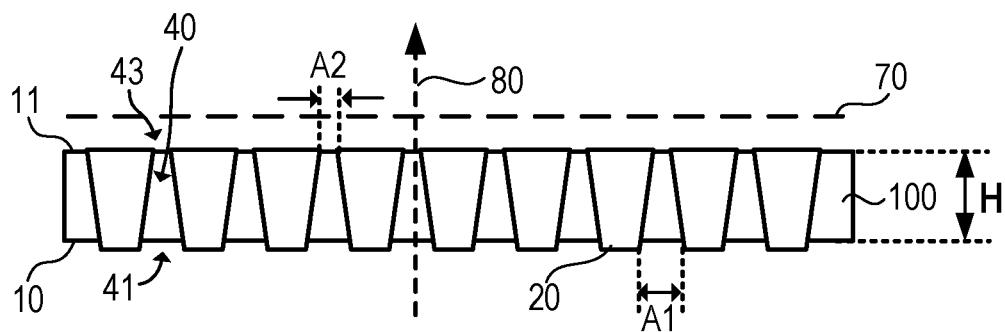

FIG. 1B shows an alternate embodiment of the optical film 100 of FIG. 1A. More specifically, FIG. 1B shows an embodiment when the orientation of the optical film 100 is disposed in an orientation that is the opposite of the orientation of optical film 100 as shown in FIG. 1A, such that second openings 43 are now facing first plane 70 (i.e., optical film 100 of FIG. 1B is "upside down" relative to optical film 100 of FIG. 1A). Other than the orientation of optical film 100, a backlight using the embodiment shown in FIG. 1B may be otherwise identical to the backlight 300 of FIG. 1A. Depending on the size of first opening 41 and second opening 43 relative to each other, the optical performance as measured in first plane 70 may be different based on the orientation of optical film 100. For example, when optical film 100 is disposed such that first opening 41 (and first open area A1) faces the light sources 60 (as shown in FIG. 1A), a first average luminance across first plane 70 may be relatively smaller and the first brightness uniformity may be relatively greater, and when optical film 100 is disposed such that second opening 43 (and second open area A2) faces the light sources 60 (as shown in FIG. 1B), the first average luminance in the first plane 70 may be relatively greater and the first brightness uniformity may be relatively smaller.

Figure 2A:
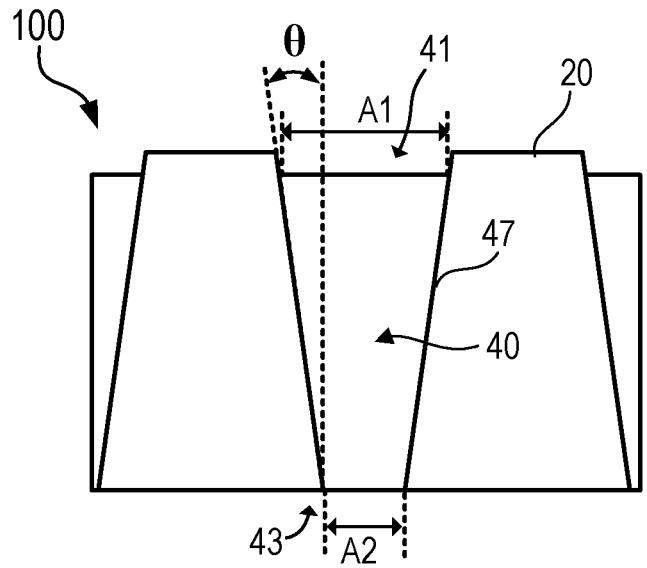
FIGS. 2A and 2B provide side views of the details of an optical film, in accordance with an embodiment of the present description.
Figure 2B:
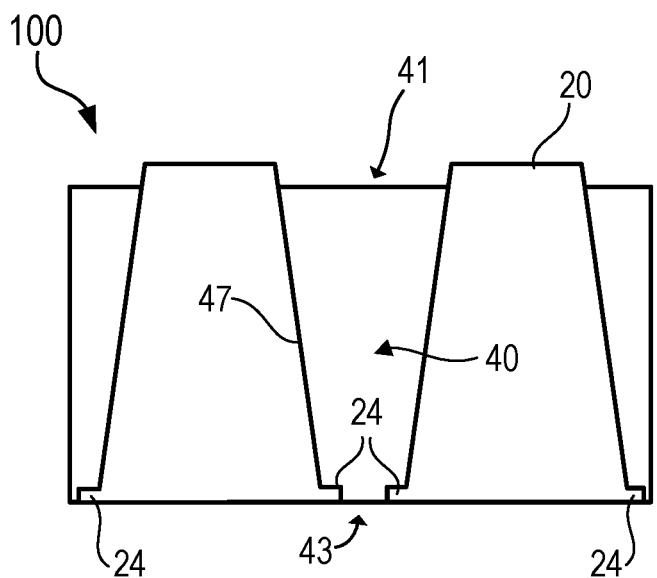

FIGS. 2A and 2B provide side views of the optical film 100 of FIG. 1A featuring additional details, according to the present description. FIG. 1A shows a close-up view of one of the through-holes 40 of optical film 100, where first open area A1 and second open area A2 are different (i.e., the areas are different). It should be noted that FIG. 2A shows one possible embodiment in which first opening 41 is larger than second opening 43, but other embodiments are possible, as discussed elsewhere herein. For example, first opening 41 may be smaller that, or equal to, second opening 43 in some embodiments.

When first open area 41 and second open area A2 are different, one or more of the sidewalls 47 may have a draft angle θ that is within ±15 degrees, or within ±10 degrees, or within +8 degrees, of the thickness direction (i.e., the z-direction, as shown in FIG. 2A). In embodiments where first open area 41 and second open area A2 are substantially equal, the draft angle θ may be substantially equal to zero (i.e., the sidewalls may be substantially vertical).

FIG. 2B shows an alternate embodiment of through-hole 40 of optical film 100. In some embodiments, at least one of the first opening 41 and the second opening 43 may include a lip 24 protruding outwardly from a perimeter of the opening toward a center of the opening. In some embodiments, light passing lip 24 may be scattered, as shown in FIG. 3B.

Figure 3A:
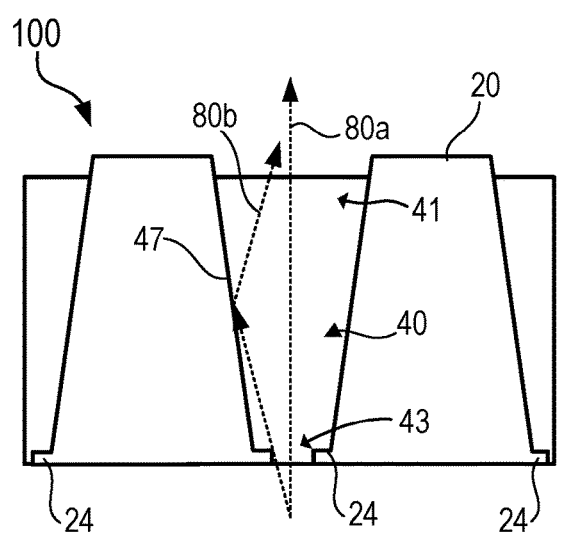
FIGS. 3A-3C provide additional details and embodiments of an optical film, in accordance with an embodiment of the present description.
Figure 3B:
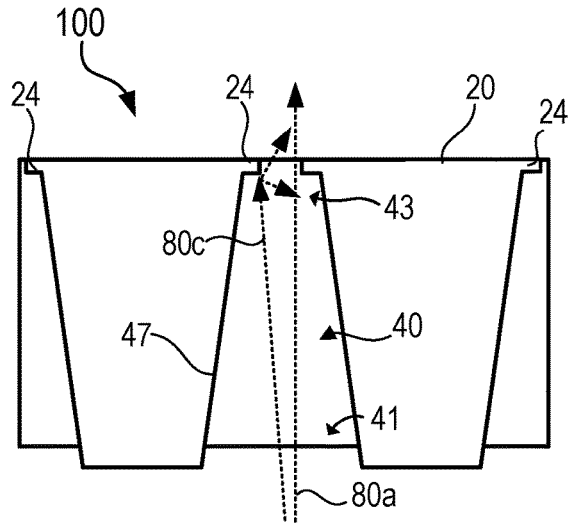
Figure 3C:
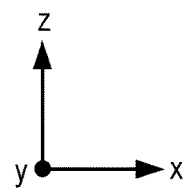
Figure 3C:
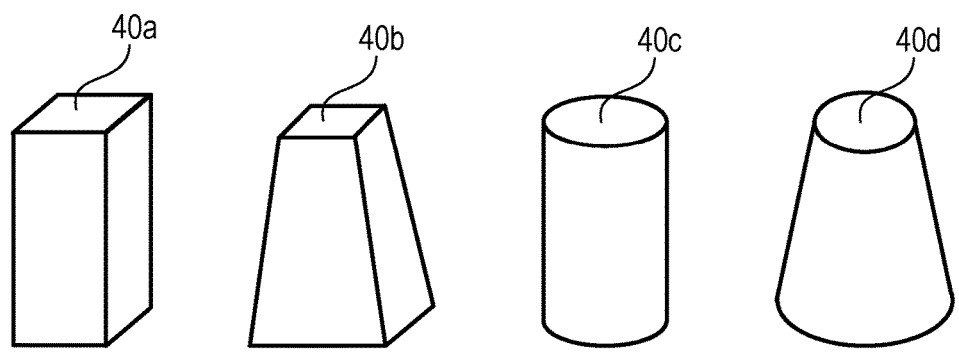

FIGS. 3A-3C provide additional details and embodiments of the optical film 100. FIG. 3A shows light rays 80a and 80b passing through optical film 100, where optical film 100 is disposed such that first opening 41 is larger than second opening 43. Light ray 80a, which is already substantially collimated (i.e., already substantially aligned with the z-direction), passes directly through the second opening 43 and then the first opening 41 without being reflected or redirected by a sidewall 47. Light ray 80b, however, enters second opening 43 at an angle, strikes sidewall 47, and is redirected up out of first opening 41. The effect of through-hole 40 is to generally collimate light rays 80 before they illuminate the display. In other embodiments, when first opening 41 is smaller than second opening 43, or when the optical film of FIG. 3A is reversed as shown in FIG. 3B, a similar collimating effect may occur with light rays 80. However, when an opening (such as second opening 43 in FIG. 3B) includes a lip 24 surrounding a perimeter of the opening, lip 24 may have the effect of scattering light rays (such as light ray 80c in FIG. 3B) as the light passes. This light scattering may increase the uniformity of the light 80 as it enters at first plane 70 (see FIG. 1) by adding a diffusion effect. Depending on the requirements of the backlight application, this may be a desirable effect. Comparing the embodiments of FIG. 3A and FIG. 3B, the embodiment of optical film 100 of FIG. 3A may have a better average luminance relative to the average luminance of FIG. 3B, but both embodiments may show an average luminance improvement (i.e., increase in luminance) over a similar backlight without optical film 100. Similarly, the embodiment of optical film 100 of FIG. 3B may have a better brightness uniformity relative to the brightness uniformity of FIG. 3A (due to the scattering/diffusing effect of lip 24), but both embodiments may show an improvement in uniformity over a similar backlight without optical film 100.

FIG. 3C illustrates some of the possible shapes of the through-hole 40, which include a rectangular prism 40a, a truncated square pyramid 40b, a cylinder 40c, and a truncated cone 40d. The shapes of FIG. 3C represent some of the possible shapes formed by the sidewalls of through-hole 40 but is not meant to be limiting. Other shapes are possible. Also, it should be noted that the shape of through-hole 40 may have imperfections or variances (e.g., lips 24, variation in sidewall angles and surfaces, curved lines, etc.) and may not be perfectly represented by the shapes shown in FIG. 3C. That is, the shape of at least a portion of through-hole 40 may be substantially equal to a truncated square pyramid (for example) but may not be a perfect truncated square pyramid.

Figure 4:
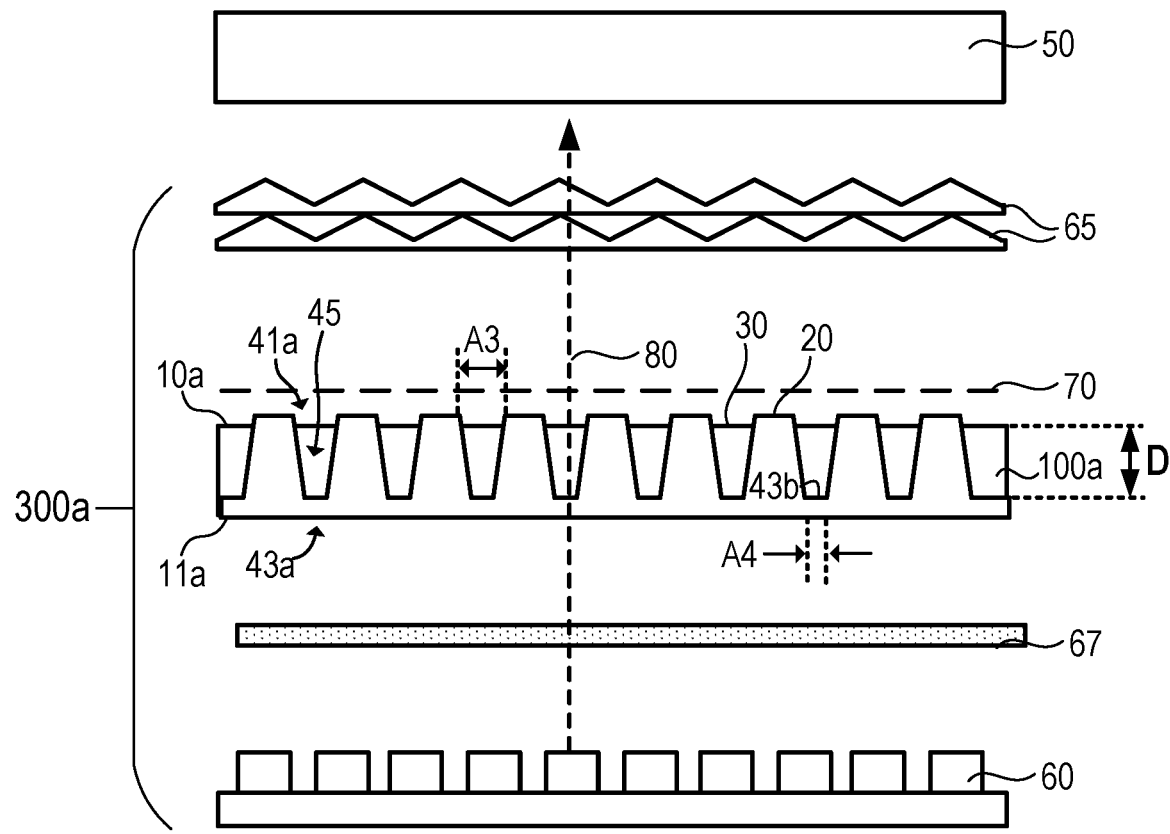
FIG. 4 illustrates a side view of an optical film, in accordance with an alternate embodiment of the present description.

FIG. 4 illustrates a side view of an alternate embodiment of a backlight 300a. The embodiment shown in FIG. 4 is similar to the embodiments of backlight 300 of FIG. 1A and has many common (like-numbered) components. The functionality of any components in FIG. 4 with corresponding like-numbered components in FIG. 1A should be assumed to have a similar functionality and description, unless otherwise specified, and may not be discussed further here. Backlight 300a is configured to provide illumination 80 to a display 50. Backlight 300a includes an optical film 100a, which differs from optical film 100 of FIG. 1A primarily in that optical film 100a includes a plurality of recesses 45 (rather than through-holes 40 as shown in FIG. 1A). Recesses 45 have a first open end 41a at first major surface 10a and a second closed end 43a at second major surface 11a, and have a depth D that extends from first open end 41a to an inner surface 43b of second closed end 43a (i.e., recesses 45 do not extend all the way down to second major surface 11a). Each first open end 41a has a first open area A3, and each second closed end 43a has a second closed area A4 (i.e., the area of inner surface 43b). It has been demonstrated in experiments that optical film 100a with recesses 45 exhibits optical performance improvements similar to optical film 100 with through-holes 40 (see FIG. 1A). It should also be noted that optical film 100a may be disposed in a reverse orientation, with second closed end 43a facing display 50, similar to the embodiment of film 100 shown in FIG. 1B, with similar optical performance benefits. The shapes 40a through 40d shown in FIG. 3C are also applicable to recesses 45 of optical film 100a. In some embodiments, the ratio of the depth D to the closed area A4 may be greater than or equal to about 0.13.

Figure 5A:
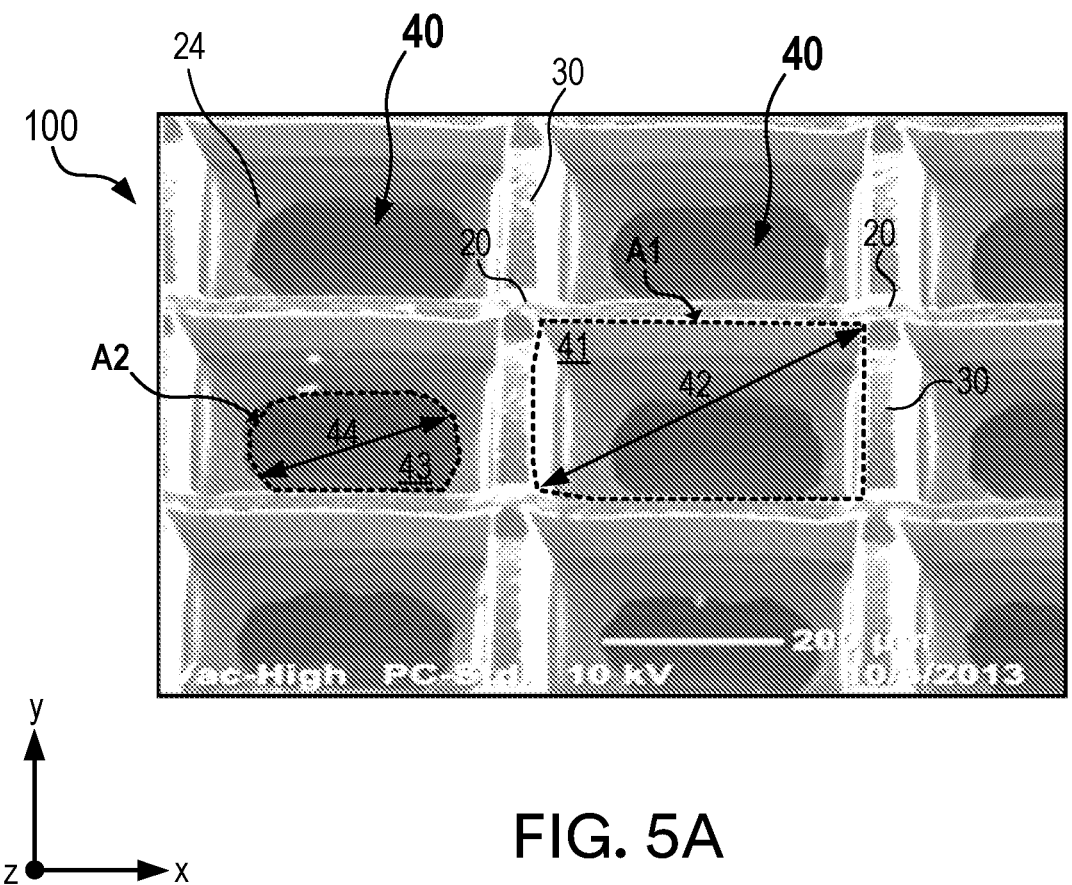
FIGS. 5A and 5B are close-up images of an optical film with microreplicated features, in accordance with an embodiment of the present description.
Figure 5B:
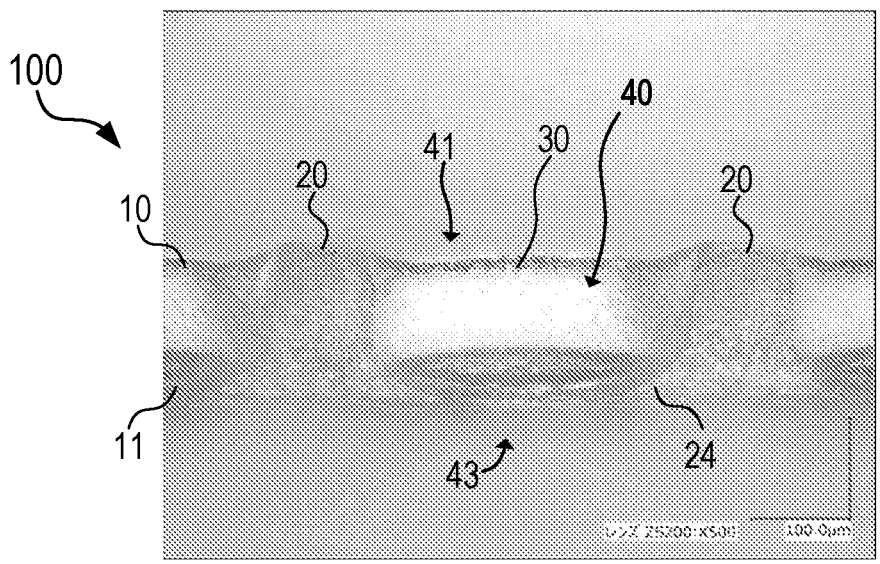
Figure 6A:
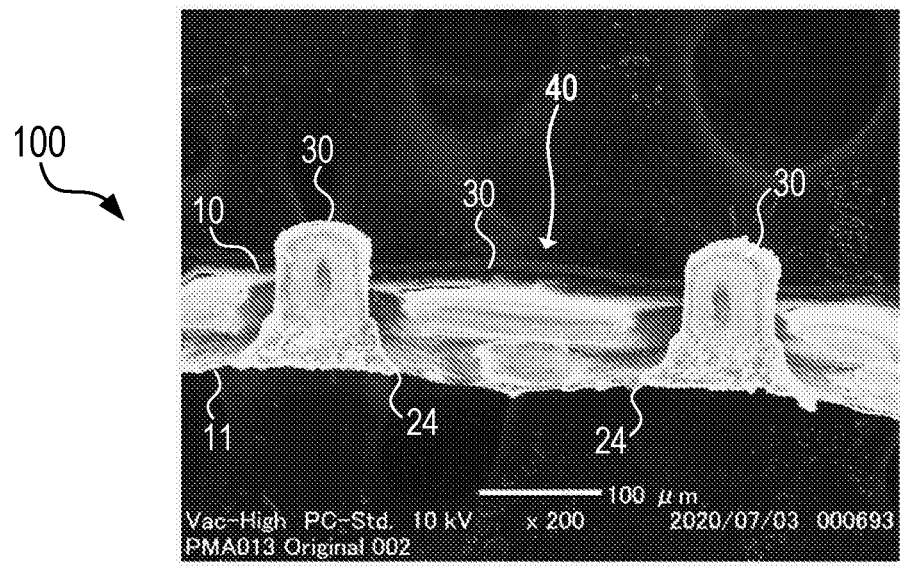
FIGS. 6A and 6B are additional close-up images of an optical film with microreplicated features, in accordance with an embodiment of the present description.
Figure 6B:
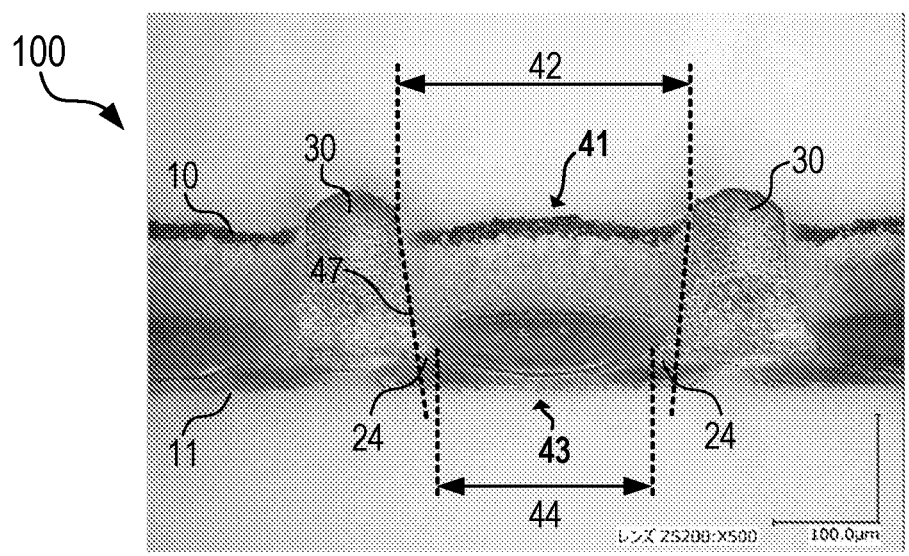

FIGS. 5A, 5B, 6A, and 6B are actual close-up images of an optical film with microreplicated features, according to the present description. The figures show the features of optical film 100 from various angles and in cross-section (FIGS. 5B, 6A, and 6B). The figures should be viewed together for the following discussion and features common across two or more of the figures (i.e., like-numbered components) shall be assumed to have a similar function unless otherwise specified. FIG. 5A shows a "top view" of optical film 100 and a plurality of through-holes 40. Each through-hole 40 has a first opening 41 having a first maximum dimension 42 and a second opening 43 with a second maximum dimension 44. In the embodiment shown in FIG. 5A, each of the first openings 41 are surrounded by and defined by four ridges 30 which extend between, and are recessed relative to, a plurality of posts 20. Lip 24 can be seen surrounding each second opening 43.

FIG. 5B shows a cross-sectional image of the optical film 100, cut through the middle of through-hole 40, showing the posts 20 with ridge 30 spanning between them. Posts 20 extend above ridge 30 and above first major surface 10. Second opening 43 on second major surface 11 features lip 24 extending out from the sidewalls of the hole into the opening.

FIGS. 6A and 6B are additional cross-sectional images showing through-hole 40 surrounded (on three sides, due to the cross-section) by ridges 30, which define the perimeter of first opening 41 on the first major surface 10. Lips 24 extend out from and define the maximum dimension 44 of the second opening 43. Sidewalls 47 may have a slope that has a slight draft angle, typically within ±10 degrees of vertical. In some embodiments, sidewalls 47 may be substantially flat, and in other embodiments sidewalls 47 may have a curvature, especially as they approach lip 24, or other non-planar features and/or deformations.

Figure 7:
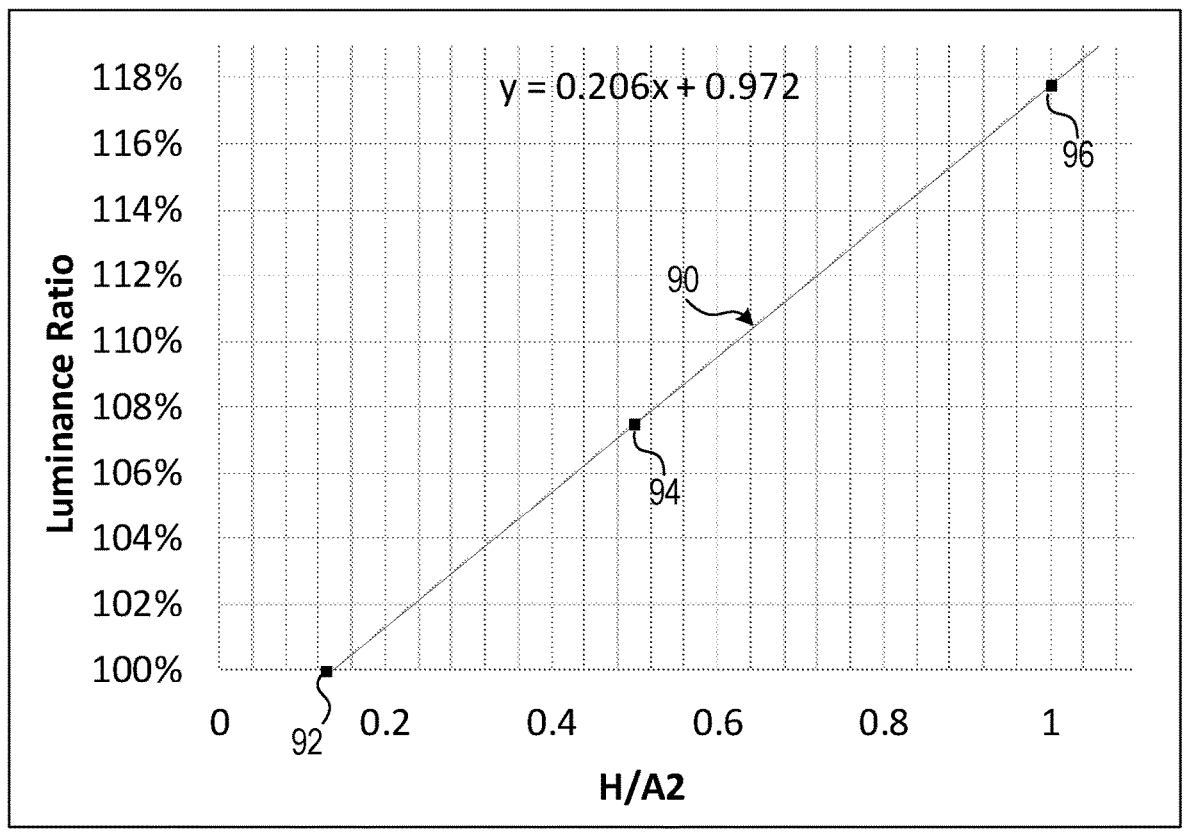
FIG. 7 is a plot showing luminance performance for various configurations of the microreplicated features, in accordance with an alternate embodiment of the present description.

FIG. 7 is a plot showing luminance improvement (i.e., luminance ratio compared to a reference value measured with no optical film present, or an optical film with no structures, representing 100%) for values of the ratio H/A2 (i.e., the ratio of the height of the through-hole, H, to the open area, A2 of the second opening). The three points shown are point 92, representing an approximate value of H/A2 of 0.13, point 94, representing an approximate value of H/A2 of 0.5, and point 96, representing an approximate value of H/A2 of 1.0. The plot of FIG. 7 shows increasing performance (i.e., increasing luminance ratio) starting at an H/A2 value of about 0.13 increasing up to an increase of nearly 18% when the ratio approach 1.0.

Figure 8:
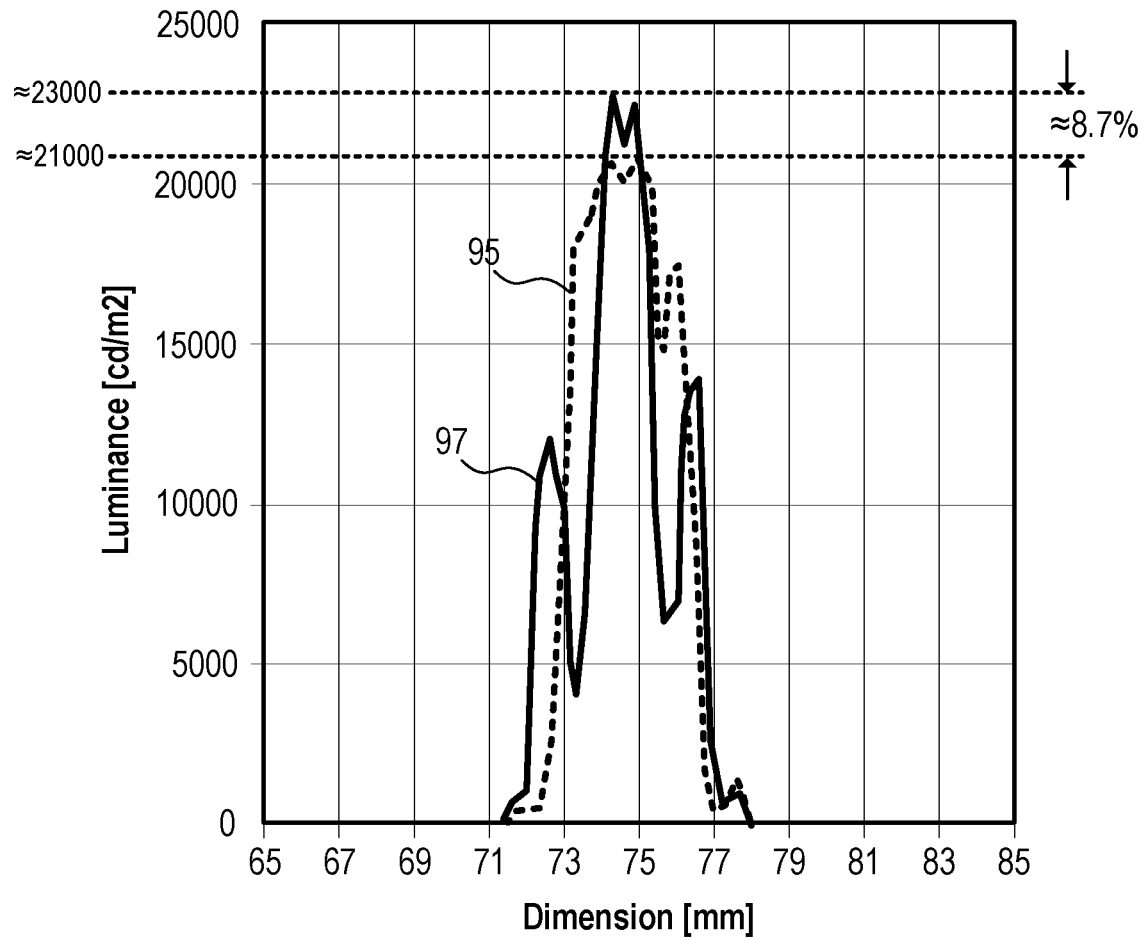
FIG. 8 is a plot comparing the peak brightness values for a display with and without an optical film disposed on the backlight, in accordance with an embodiment of the present description.

FIG. 8 is a plot comparing the peak brightness values for a display with and without an optical film as described herein disposed on the backlight. Plot 95 represents the plot of peak brightness shown for an LED without an optical film in place and shows a peak brightness value of approximately 21000 cd/m² (candela per square meter, also known as a nit). Plot 97 represents the plot of peak brightness shown for the same LED with an optical film disposed over the LED and shows a peak brightness value of approximately 23000 cd/m², which represents an approximate gain in peak brightness value of 8.7%. It should be noted that the brightness value measured at any given point above the optical film may vary based on a particular LED's alignment with the through-hole, and that peak brightness values with the optical film in place may come result when the LED is substantially aligned with the through-hole. At other times, such as when a post (such as post 20 as shown in FIG. 5A) aligns with the LED, the brightness value may decrease significantly from the peak brightness value shown here. It is a combination of increases in peak brightness from some LEDs and increased scattering from other LEDs that contribute to both an overall increase in average luminance across the display and a corresponding increase in uniformity across the display.

Figure 9A:
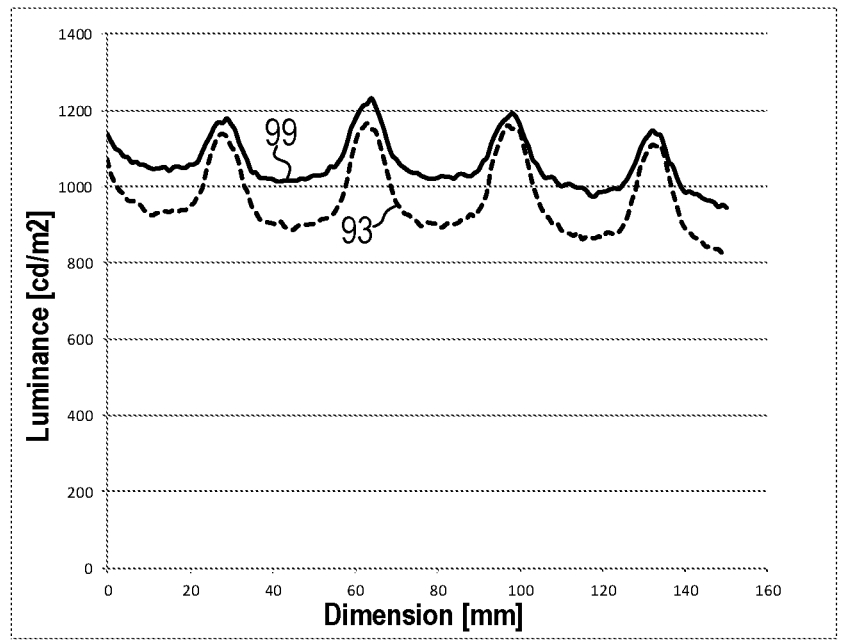
FIGS. 9A and 9B are plots comparing display uniformity performance for a display with and without an optical film disposed on the backlight, in accordance with an embodiment of the present description.
Figure 9B:
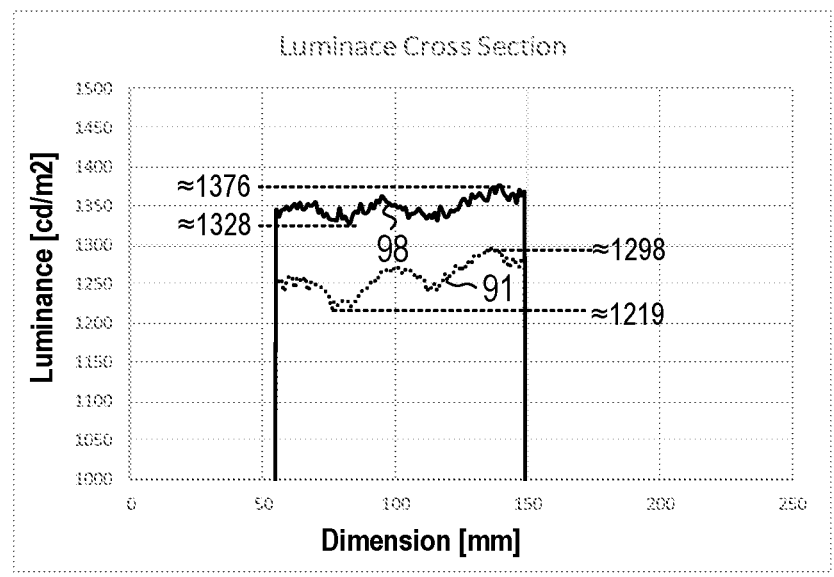

FIGS. 9A and 9B are plots comparing display uniformity performance for a display with and without an optical film disposed on the backlight. FIG. 9A shows the plots of luminance values measured across a display for a backlight featuring the microreplicated optical film according to the present description 99 and the values measured across a display for a backlight where the microreplicated film was replaced with an optically-transparent, non-structured film of polyethylene terephthalate (PET). The values for the microreplicated optical film 99 show both an increase in luminance values across the display over the featureless PET film but also an increase in uniformity (i.e., a smaller difference in contrast between minimum and maximum luminance values). FIG. 9B shows another example measurement using a microreplicated optical film 98 and a featureless PET film 91. The minimum and maximum luminance values shown by these plots, as well as the LD luminance uniformity values they represent, are summarized in Table 1. It should be noted that, in terms of uniformity, a smaller contrast value is better than a larger contrast value. As shown in Table 1, the measured performance for the microreplicated optical film (i.e., film featuring the through-holes of, for example, FIG. 1A) showed an approximate improvement in contrast of about 2.88%. Similar example films were measured and showed improvements of at least 2.88% and often greater improvement values. These examples are discussed in more detail elsewhere herein.

TABLE 1

Luminance Contrast Comparison

| | Microrep. Film | PET |
|---|---|---|
| Maximum Value | 1375.74 cd/m2 | 1298.31 cd/m2 |
| Minimum Value | 1327.62 cd/m2 | 1218.98 cd/m2 |
| LED Luminance Uniformity | 103.62% | 106.51% |
| Difference | | 2.88% |

Figure 10:
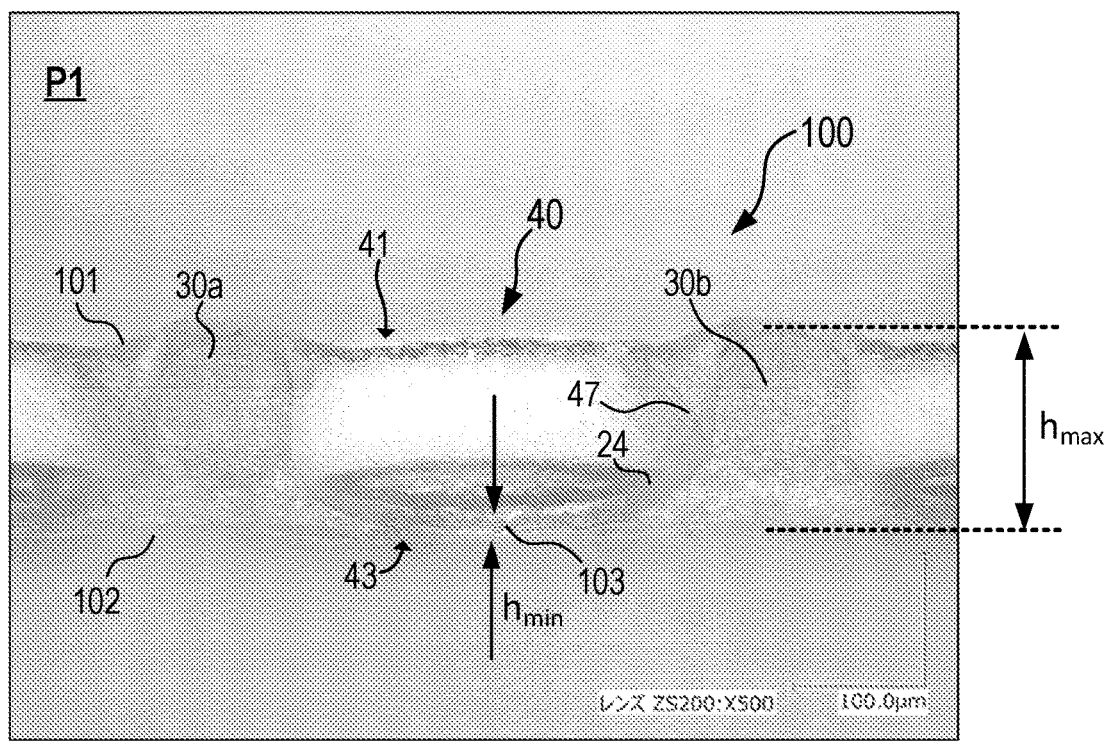
FIG. 10 is an additional close-up image of an optical film with microreplicated features, in accordance with an embodiment of the present description.

FIG. 10 is an additional close-up image of an optical film with microreplicated features, highlighting additional details of an embodiment of the optical film. In some embodiments, optical film 100 includes a regular, two-dimensional array of intersecting ridges 30 defining a plurality of through-holes 40 therebetween (see, for example, FIG. 5A). FIG. 10 shows a cross-sectional view of optical film 100 showing a plane P1 (i.e., the plane of FIG. 10) that is parallel to a thickness direction (i.e., the z-axis shown in FIG. 10) of optical film 100. The cross-section of plane P1 includes two adjacent ridges 30a, 30b in the array of ridges and a through-hole 40 therebetween.

In some embodiments, optical film 100 may have a maximum thickness $h_{max}$. In some embodiments, through-hole 40 extends between first open end 41 and second open end 43 of the through-hole 40 at opposing respective first 101 and second 102 major surfaces of optical film 100. In some embodiments, the through-hole 40 has a side wall 47 which is a substantially vertically-oriented portion connected to first open end 41 of through-hole 40. In some embodiments, through-hole 40 also has a substantially horizontally-oriented portion 24 (e.g., a lip) extending from the substantially vertically-oriented portion 47 and connected to second open end 43 of through-hole 40. In some embodiments, the substantially horizontally-oriented portion 27 may have a minimum thickness $h_{min}$ at a location 103 disposed between the two adjacent ridges 30a and 30b, such that the ratio $h_{max}/h_{min}$ is greater than or equal to about 2, or about 3, or about 4, or about 5, or about 6, or about 7, or about 8, or about 9, or about 10.

Finally, FIG. 11 is an embodiment of a backlight for providing illumination to a display featuring two or more optical films. It should be noted that FIGS. 1A and 11 share many like-numbered elements, and it should be assumed that like-numbered elements have a similar function unless otherwise specified. Descriptions of elements from FIG. 1A apply equally to their like-numbered elements of FIG. 11, and these elements may not be described in the discussion of FIG. 11. FIG. 11 is a side view of a backlight 300a for providing illumination to a display 50. In some embodiments, backlight 300a provides illumination 80 to display 50. In some embodiments, backlight 300a may include a plurality of spaced-apart, discrete light sources 60 and an optical stack 150 with two or more optical films optical films 100. In some embodiments, the discrete light sources 60 face the display (i.e., emit light 80 toward the display, in the z-direction shown in FIG. 11) and are arranged in rows and columns of the light sources 60 (e.g., a matrix of light-emitting diodes with rows in the x-axis and columns in the y-axis). The optical stack 150 may be disposed on or proximate the light sources 60 and below and proximate a first plane 70 (i.e., a reference plane for discussion purposes). In some embodiments, each of the optical films 100 in optical stack 150 may include a plurality of through-holes 40 arranged in rows (e.g., the x-axis) and columns (e.g., the y-axis) of each optical film. Each of the plurality of through-holes 40 extend between a first major surface 101 and a second major surface 103 of the optical film 100. In some embodiments, each through-hole 40 may have a first opening 41 in the first major surface 101 with a first open area A1, and a second opening 43 in the second major surface 103 with a second open area A2. Each through-hole has a length, H, along the first direction (i.e., along the z-axis, as shown in FIG. 11, or the "thickness direction").

In some embodiments of the optical film, the ratio of H/A2 is configured such that it is greater than or equal to about 0.13. In some embodiments, when light sources 60 emit light 80, light 80 emitted by all the light sources 60 may have a first average luminance in the first plane 70, and, in the absence of the optical stack 150, the light 80 emitted by all the light sources 60 may have a second average luminance in the first plane 70, such that the first average luminance is greater than the second average luminance.

In some embodiments, the backlight 300a may further include a diffuser layer 200 with a plurality of microstructures 210. In some embodiments, each microstructure 210 may have the shape of a square pyramid.

In some embodiments, each film 100 in optical stack 150 may be oriented the same as each of the other optical films 100 in the optical stack 150. For example, each film 100 may be oriented with first opening 41 facing display 50 and second opening 43 facing light sources 60 (as shown in FIG. 11). In another example, each film 100 may be oriented with first opening 41 facing light sources 60 and second opening 43 facing display 50. In another embodiment, at least one of optical films 100 may be oriented such that first opening 41 faces the display 50, while at least one other of optical films 100 may be oriented such that first opening 41 faces light sources 60 (i.e., some of the films 100 may be flipped with respect to the other films 100).

EXAMPLES

Table 2 shows the results of luminance contrast measurements taken for a number of Example films. Each of the Example films listed in Table 2 were made using a microreplication process, and all luminance measurements were made with a Konica Minolta CA-2500 2D color analyzer. All example microreplicated films measured showed an improvement in luminance contrast of at least about 2.88% ranging up to about 11.29%. The Reference Film used in each example below was a featureless (no through-holes or structure), optically transparent polyethylene terephthalate (PET) film.

TABLE 2

Example Film Results

| Example Film # | Backlight Set-Up (Combined Films Present) | Location of Microreplicated Film | Microreplicated Film Material |
|---|---|---|---|
| Example1 | Polarizer film, reflective polarizer(3M APF-V3), Stacked type prism film(3M ASOC4-HH), diffuser sheet(3M UDF), Color conversion sheet(Dexerials), blue light transmissive film(3M BLT) | Microreplicated film located between color conversion sheet and blue light transmissive film(3M BLT) | Polypropylene |
| Example2 | | Microreplicated film located between diffuser sheet(3M UDF2) and color conversion sheet | Polypropylene |
| Example3 | Stacked type prism film(3M ASOC4-HH), Diffuser sheet(3M UDF), Color conversion sheet(Dexerials) | | Polypropylene |
| Example4 | Polarizer film, reflective polarizer(3M APF-V3), Stacked type prism film(3M ASOC4-HH), diffuser sheet(3M UDF), Color conversion sheet(Dexerials), blue light transmissive film(3M BLT) | Microreplicated film located between diffuser sheet(3M UDF2) and color conversion sheet | Polypropylene |
| Example5 | Stacked type prism film(3M ASOC4-HH), diffuser sheet(3M UDF), Color conversion sheet(Dexerials) | Microreplicated film located under color conversion sheet | Polypropylene |
| Example6 | Polarizer film, reflective polarizer(3M APF-V3), Stacked type prism film(3M ASOC4-HH), diffuser sheet(3M UDF), Color conversion sheet(Dexerials), blue light transmissive | Microreplicated film located between diffuser sheet(3M UDF2) and color conversion sheet | Polypropylene |
| Example7 | | | Polypropylene |
| Example8 | | Microreplicated film located under blue light transmissive film(3M BLT) | Polypropylene |
| Example9 | | | Polypropylene |
| Example10 | | Microreplicated film located between diffuser sheet(3M UDF2) and color conversion sheet | Polypropylene |
| Example11 | | | Polypropylene & Acrylic OCA 10 um & PET 25 um |
| Example12 | | Microreplicated film located under blue light transmissive film(3M BLT) | Polypropylene |
| Example13 | | | Polypropylene & Acrylic OCA 10 um & PET 25 um |

| Example Film # | Thickness of Microreplicated Film | Hole Details | Ref. Film LED Uniformity Increase over Reference | Microrep. Film LED Uniformity Increase over Reference | Percent Improv. |
|---|---|---|---|---|---|
| Example1 | 150 um | with hole, φ: 44 um | 142% | 130% | 11.29 |
| Example2 | 150 um | with hole, φ: 44 um | 109% | 103% | 5.61 |

TABLE 2-continued

Example Film Results

| Example | | | | | |
|---|---|---|---|---|---|
| Example3 | 150 um | with hole, φ: 44 um | 122% | 115% | 7.52 |
| Example4 | 150 um | with hole, φ: 44 um | 106.5% | 104% | 2.88 |
| Example5 | 300 um(two layer MrPF 150 um) | with hole, φ: 44 um | 115% | 109% | 5.21 |
| Example6 | 276 um | with hole, ellipse. 243 × 180 um | 119% | 113% | 6.16 |
| Example7 | 282 um | without hole | 119% | 113% | 5.69 |
| Example8 | 276 um | with hole, ellipse. 243 × 180 um | 117% | 110% | 6.54 |
| Example9 | 282 um | without hole | 117% | 113% | 3.83 |
| Example10 | 150 um | with hole, φ: 44 um | 1.16 | 113% | 3.82 |
| Example11 | 150 um | with hole, but masked by OCA& PET film | 1.16 | 112% | 4.05 |
| Example12 | 150 um | with hole, φ: 44 um | 115% | 109% | 5.81 |
| Example13 | 150 um | with hole, but masked by OCA& PET film | 115% | 110% | 4.81 |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A backlight for providing illumination to a display panel, the backlight comprising:
   a two-dimensional array of spaced apart discrete light sources; and
   a plurality of optical films disposed on the light sources and configured to be disposed between the display panel and the light sources, each of the optical films comprising a regular two-dimensional array of intersecting ridges defining a plurality of through-holes therebetween, each of the through-holes extending between first and second open ends of the through-hole at opposing respective first and second major surfaces of the optical film, such that in at least a first cross-section of the optical film in a first plane that is parallel to a thickness direction of the optical film and includes two adjacent ridges in the array of ridges and a through-hole therebetween, the optical film has a maximum thickness $h_{max}$ and the through-hole comprises a side wall comprising a substantially vertically-oriented portion connected to the first open end of the through-hole and a substantially horizontally-oriented portion extending from the substantially vertically-oriented portion and connected to the second open end, the substantially horizontally-oriented portion having a minimum thickness $h_{min}$ at a location disposed between the two adjacent ridges, $h_{max}/h_{min} \geq 2$;

wherein, the regular two-dimensional array of intersecting ridges of each of the optical films forms orthogonal rows and columns of the posts, and wherein for at least two of the optical films in the plurality of the optical films, the rows of one of the two optical films make an angle of between about 10 degrees to about 80 degrees with the rows of the other one of the two optical films.

2. The backlight of claim 1, wherein the plurality of optical films comprises at least three optical films.

3. The backlight of claim 1, further comprising a diffuser layer disposed between the plurality of optical films and the display panel.

4. The backlight of claim 3, wherein a surface of the diffuser layer comprises a plurality of microstructures.

5. The backlight of claim 4, wherein each microstructure in the plurality of microstructures has the shape of a square pyramid.

6. The backlight of claim 1, wherein one of the first and second open ends of each of the through-holes of the plurality of through-holes is larger than the other of the first and second open ends.

7. The backlight of claim 1, wherein a slope of an inner wall of each of the through-holes of the plurality of through-holes is within +15 degrees of the thickness direction.

8. The backlight of claim 1, wherein each through-hole of the plurality of through-holes defines a distance, H, between the first opening and the second opening, the second opening has an open area A2, and the ratio of H/A2 is greater than or equal to about 0.13.

9. The backlight of claim 6, wherein each optical film of the plurality of optical films is oriented the same as each of the other optical films in the plurality of optical films.

10. The backlight of claim 9, wherein each optical film of the plurality of optical films is oriented such that the larger of the first open end and the second open end is facing the display.

11. The backlight of claim 9, wherein each optical film of the plurality of optical films is oriented such that the larger of the first open end and the second open end is facing the two-dimensional array of spaced apart discrete light sources.

12. The backlight of claim 1, wherein for at least two of the optical films in the plurality of the optical films, the rows of one of the two optical films make an angle of less than about 20 degrees with the rows of the other one of the two optical films.

13. A backlight for providing illumination along a first direction to a display disposed thereon, the backlight comprising:

a plurality of spaced apart discrete light sources arranged in rows and columns of the light sources and configured to face the display;

an optical stack comprising two or more optical films disposed on the light sources and below and proximate a first plane, the optical stack and the first plane configured to be disposed between the display and the light sources; and a diffuser layer, disposed between the optical stack and the display;

wherein each optical film in the optical stack comprises a plurality of through-holes arranged in rows and columns of the through-holes and extending between first and second major surfaces of the optical film, each through-hole having a first opening at the first major surface and having a first open area, A1, and a second opening at the second major surface and having a second open area, A2, each through-hole having a height, H, along the first direction such that the ratio of H/A2 is greater than or equal to about 0.13, such that:

when all the light sources emit light, the light emitted by all the light sources has a first average luminance in the first plane, and in the absence of the optical stack, the light emitted by all the light sources has a second average luminance in the first plane, wherein the first average luminance is greater than the second average luminance;

wherein A1 is greater than A2, and wherein at least one optical film in the optical stack is disposed such that A1 faces the display, and at least one other optical film in the optical stack is disposed such that A1 faces the plurality of spaced apart discrete light sources.

14. The backlight of claim 13, wherein the optical stack comprises three or more optical films.

15. The backlight of claim 13, wherein each optical film in the optical stack is disposed such that A1 faces the plurality of spaced apart discrete light sources.

16. The backlight of claim 13, wherein each optical film in the optical stack is disposed such that A1 faces the display.

* * * * *